United States Patent [19]

Mueller et al.

[11] Patent Number: 4,702,498

[45] Date of Patent: Oct. 27, 1987

[54] FLANGE CONNECTION FOR FIBER-REINFORCED PLASTIC PIPE PIECES

[75] Inventors: Wilhelm Mueller, Neuhausen; Friedhelm Overath; Michael Weyer, both of Schaffhausen, all of Switzerland

[73] Assignee: Georg Fischer Aktiengesellschaft

[21] Appl. No.: 921,676

[22] Filed: Oct. 21, 1986

[30] Foreign Application Priority Data

Oct. 31, 1985 [CH] Switzerland ........................ 4693/85

[51] Int. Cl.⁴ .............................................. F16L 58/00

[52] U.S. Cl. ...................................... 285/55; 285/368; 428/36

[58] Field of Search ..................... 428/36; 285/55, 368

[56] References Cited

U.S. PATENT DOCUMENTS 2,070,291 2/1937 McHugh ................................ 285/55
3,572,392 3/1971 McLarty ........................ 285/423 X
3,700,268 10/1972 Nielsen, Jr. ........................... 285/55
3,702,199 11/1972 Brooks et al. ......................... 285/55
3,705,735 12/1972 Davidson et al. ................ 285/55 X
4,614,369 9/1986 Overath et al. ....................... 285/55
4,619,470 10/1986 Overath et al. ................ 285/368 X

*Primary Examiner*—Henry F. Epstein
*Attorney, Agent, or Firm*—Toren, McGeady & Associates

[57] ABSTRACT

A flange connection of pipe pieces having an outer layer composed of a laminate and provided with grooves. A two-part sleeved collar of the same material is radially placed onto the pipe piece. Projections provided on the radially inner surface of the flanged sleeve are placed in the grooves. The two parts of the flanged sleeve are fixedly connected to the pipe pieces by means of gluing, the two parts of the flanged sleeve being held together until the adhesive has cured by means of a flange ring slid onto a conical portion of the flanged sleeve. A cover ring is fastened to the end of the inner layer of the pipe piece made of a thermoplastic material, so that the medium conducted through the pipes does not come into contact with the couter layer and the flanged sleeve.

5 Claims, 3 Drawing Figures

15
16
17
13
14
6
8
10
5, 5a
7
3
1
1
2
II
18
11
12
9
4
II

5a 3
2
19
19
5b 13
6
5
3
2
11
12
18

FLANGE CONNECTION FOR FIBER-REINFORCED PLASTIC PIPE PIECES

BACKGROUND OF THE INVENTION

1. Field of the Invention

The present invention relates to a flange connection for fiber-reinforced plastic pipe pieces which are composed of an inner layer of thermoplastic material and an outer layer of wound fiber impregnated with synthetic resin.

2. Description of the Prior Art

For conducting media, particularly aggressive media in the chemical industry, pipes are used which are composed of an inner layer of a thermoplastic material, such as, polyethylene, polypropylene, polyvinylchloride, etc., and of an outer layer of a fiber-reinforced laminate, such as, wound glass fibers impregnated with an unsaturated polyester resin or epoxy resin. The outer laminated layer has the purpose to reinforce the pipes, so that media can be conducted at high pressures. The outer laminated layer also serves to absorb external forces which act on the pipe, such as, tension/compressive forces or bending forces.

When preparing detachable connections between pipes or between pipes and fittings, such as, angles, tees, or reducing pieces, it is important that the medium not come into contact with the outer layer and that the external forces are essentially transmitted through the outer layer.

In a known flange connection according to German Industrial Standard DIN 16966, Type B, the facing surfaces of the end of the pipe and of a flanged sleeve are conically inclined and the surfaces are glued together. This results in a glued connection, however, the parts are not connected to one another in a locking manner. The resulting connection between flanged collar and outer layer of the pipe is of insufficient strength.

In another known flange connection of the afore-described type, see EP-A2-152753, the flanged collar is fastened to a tubular part by means of a thread. However, it is difficult to make threads on parts which are made of glass fiber laminates and the quality of the thread is frequently not satisfactory for a trouble-free connection. In addition, free space is required for screwing the flanged sleeve in axial direction, this free space frequently not being available at the location where the connection is to be made.

Therefore, it is the primary object of the present invention to provide a flange connection of the above-described type, in which the above-described disadvantages are avoided, which can be made at the location where the connection is to be used, and which meets the above-mentioned requirements with respect to the transmission of forces and the surfaces with which the medium to be conducted comes into contact.

SUMMARY OF THE INVENTION

In accordance with the present invention, a flange connection for fiber-reinforced plastic pipe pieces wherein the pipe is composed of an inner layer of thermoplastic material and an outer layer of wound fiber-impregnated with synthetic resin includes a flanged sleeve each glued onto the ends of the pipe pieces to be connected, wherein each flanged sleeve is axially split into two parts. The flange portions of the two flanged sleeves face one another in axial direction. A loose flange ring each is placed on each sleeve portion. A cover ring each is fixed onto the pipe pieces to be connected so as to cover the pipe ends. The radially inwardly facing surface of each flanged sleeve and the radially outwardly facing surface of the ends of the pipe pieces to be connected include matching grooves and projections for securing the connection of the flanged sleeves to the pipe pieces in axial direction. The radially outwardly facing surface of each sleeve portion is conically inclined so that the width of the sleeve portion decreases away from the flange portion. The corresponding radially inwardly facing surface of the flange ring is conically inclined so as to match the radially outwardly facing surface of the sleeve portion.

In accordance with the present invention, it is possible to place the two flanged sleeve halves radially onto the pipe pieces to be connected. The matched engagement of the projections in the grooves ensure that forces can be transmitted in axial direction in a locking manner onto the outer layer of the pipe piece.

By gluing the flanged sleeve and the outer layer together, a fixed connection to the pipe piece is obtained in which any possibly existing hollow space can be filled out with adhesive in order to prevent permeation damage.

By providing an undulated shape of the grooves and projections, notch effects are essentially avoided.

By using a standard-type flange as the flange ring, the fiber-reinforced plastic pipe pieces can be connected to other systems and also to valves and slight angle deviations in the connection are permissible.

The flange connection can be made directly at the point of assembly, so that it is not necessary to prefabricate any adapting pieces.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
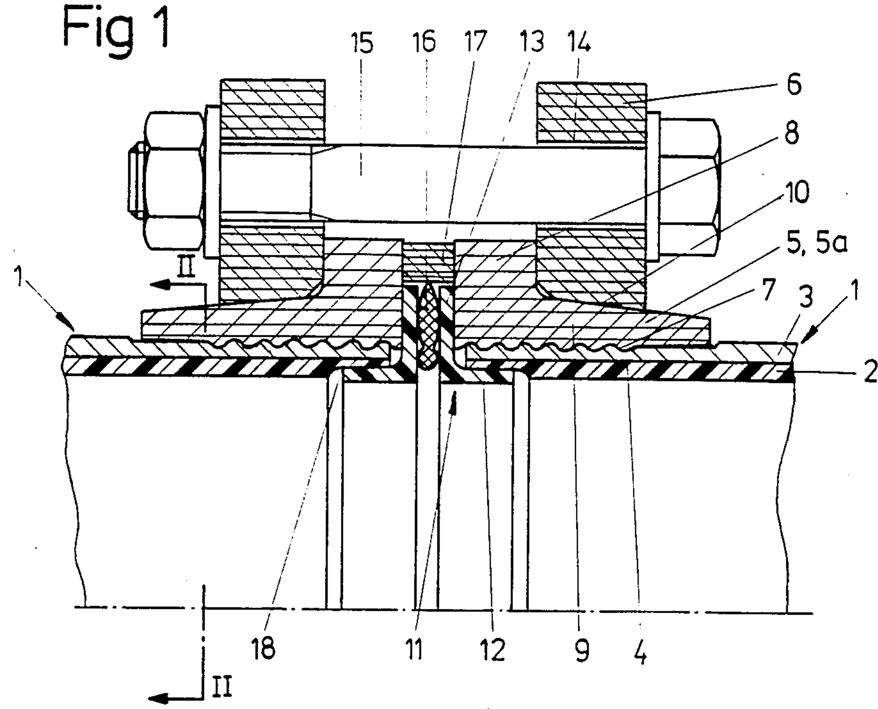
FIG. 1 is a partially sectional view of a flange connection for fiber-reinforced pipe pieces according to the invention.
Figure 2:
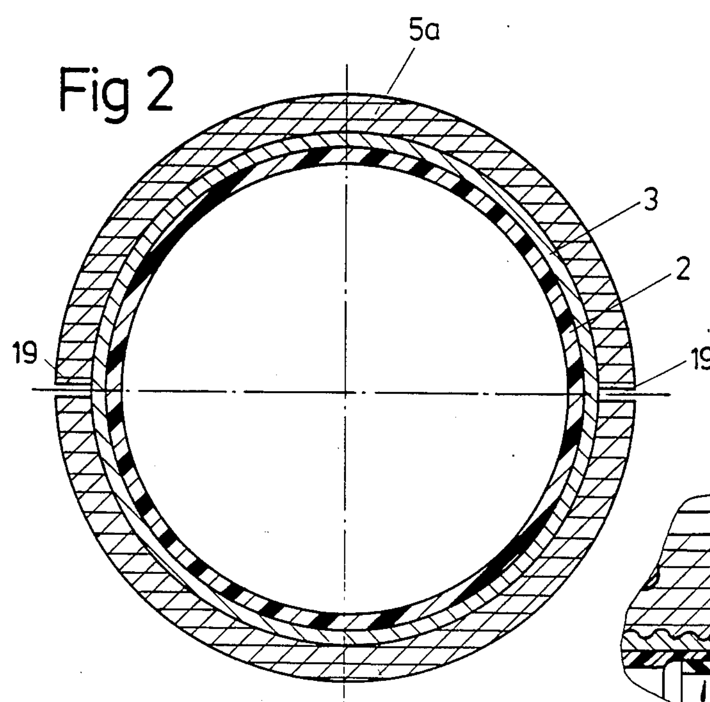
FIG. 2 is a sectional view of the connection illustrated in FIG. 1, taken along sectional line II—II of FIG. 1.

FIGS. 1 and 2 show a detachable flange connection between two tubular parts 1, for example, a pipe, a fitting, such as, a bend, angle, tee or reducing sleeve, or the connecting piece of an instrument.

The tubular or pipe piece 1 has an inner layer 2 of a thermoplastic material, such as, polyethylene, polyvinylchloride, etc., and an outer layer 3 of wound fiber impregnated with synthetic resin. A laminate of glass fibers with an unsaturated polyester resin or epoxy resin is preferably used.

The outer layer is applied by means of a laminating process onto extruded pipes or prefabricated fittings made, for example, by die-casting, and the outer layer and the inner layer are fixedly connected to one another by an adhesive.

The end of each pipe piece 1 is provided with circumferentially extending grooves 4 which preferably have an undulated shape. In other words, the cross-sectional shape of the grooves is round and the grooves have rounded transitions. After the pipes have been cut to the desired length, the grooves 4 are made in the pipes by means of a mechanical process.

A flanged sleeve 5 provided with a loose flange ring 6 is mounted on the end of pipe piece 1. Flanged sleeve 5 and flange ring 6 are also made of a laminate, preferably of glass fiber and synthetic resin.

Flanged sleeve 5 is split in axial direction and, thus, is composed of the two parts **5*a* and 5*b*. The inner circumferential surface of the flanged sleeve 5 has undulated projections 7 which are placed in the grooves 4 of the outer layer 3 so as to effect a locking connection in axial direction. In addition to the locking connection described above, the flanged sleeve 5 is fixedly connected by gluing to the pipe piece 1. Other cross-sectional shapes of the grooves 4** and the corresponding projections are also possible, such as, rectangular, triangular, or saw-toothed shapes, preferably with rounded corners.

Flanged sleeve 5 has a sleeve portion 9 which becomes conically smaller away from flange 8. The radially inwardly facing surface 10 of flange ring 6 is conically inclined corresponding to the conical surface of sleeve portion 9. Thus, when the two parts **5*a*, 5*b* of flanged sleeve 5 are mounted on the pipe pieces, the parts 5*a*, 5*b* are held in place on the pipe piece 1 during the gluing process by sliding the flange ring 6 to the conical sleeve portion 9**.

A cover ring 11 is with a cylindrical portion 12 fixedly and tightly connected to the inner layer 2. With its flange portion 13, the cover ring 11 covers the end of pipe piece 1 and partially covers the end face of flanged sleeve 5. Cover ring 11 is preferably of the same thermoplastic material as the inner layer 2 and is welded or glued to the latter in a reduced diameter portion 18.

A detachable connection between two equally shaped pipe pieces 1 is effected by means of screws 15 extending through holes 14 formed in flange rings 6. Between end faces of the cover rings 11 is placed a sealing member 16 of a material which is elastic and resistant against the medium conducted through the pipes. In addition, at the outer circumference of sealing member 16, a spacer ring 17 may be arranged between the flanged sleeves 5. The spacer ring 17 fixes the compression of the sealing member 16 and may also be made of a glass fiber laminate.

Figure 3:
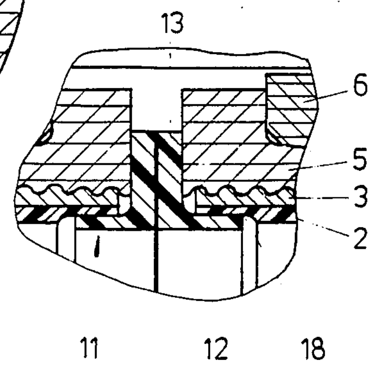
FIG. 3 is a partial sectional view, on a larger scale, of a modification of the flange connection illustrated in FIG. 1.

In the modified flange connection illustrated in FIG. 3, the cover rings 11 are simultaneously formed as sealing members. The cylindrical portions 12 of the cover rings 11 made of a thermoplastic material are welded or glued into a reduced diameter portion 18 of inner layer 2. The sealing surfaces of the flange portions 13 of the cover rings 11 must be smooth and plane.

In the following, the manner in which the flange connection according to the invention is made shall be explained. After the pipes have been cut, the grooves 4 are formed in the outer layer 3 by means of a mechanical process. An adhesive material, preferably a two-component adhesive, is applied onto the pipe pieces by means of a spatula until the grooves are filled. The grooves of the split flanged sleeve 5 are filled in the same manner with an adhesive material.

After sliding the flange ring 6 onto the pipe, the flanged sleeve halves **5*a*, 5*b* are radially placed on the pipe and the flange ring 6 is slid onto the conical portion 9 of the flanged sleeve 5**.

A plate having a plurality of boreholes is placed against the end of the pipe piece and the flange ring is forced by means of screws against flange 8, so that the two flanged sleeve halves **5*a*, 5*b* are firmly pressed against pipe 1. The excessive adhesive material which is squeezed out at the front, the rear and at the axial gaps 19** is removed. The flanged ring is clamped in this manner until the adhesive material has hardened.

The plate is subsequently removed and the flange ring 6 is slid back. The cover ring 11 is then inserted and welded to the inside wall of the pipe.

In order to connect the flange to the flange of a second pipe prepared in the same manner or to a flange formed on an instrument or on a fitting, the flange ring 6 is pulled by means of screws 15 until it makes contact with flange 8. The dimensions of the conically extending surface 10 and of the conical sleeve portion 9 of the flanged sleeve 5 are selected in such a way that these surfaces make contact with one another but that the end of the pipe is not deformed in radial direction.

While specific embodiments of the invention have been shown and described in detail to illustrate the application of the inventive principles, it will be understood that the invention may be embodied otherwise without departing from such principles.

We claim:

1. A flange connection for fiber-reinforced plastic pipe pieces, wherein the pipe is composed of an inner layer of thermoplastic material and an outer layer of wound fiber impregnated with synthetic resin, a flanged sleeve each having a flange portion and a sleeve portion glued onto the ends of the pipe pieces to be connected, each flanged sleeve axially split into two parts, wherein the flange portions of the sleeves face one another in axial direction and the sleeve portions of the sleeves extend away from the flanges, a loose flange ring each placed on each flanged sleeve, a cover ring each fixed to the pipe pieces to be connected so as to cover the pipe ends, the radially outwardly facing surface of the ends of the pipe pieces to be connected including matching circumferentially extending grooves and projections for securing the connection of the flanged sleeves to the pipe pieces in axial direction, wherein the radially outwardly facing surface of the sleeve portion of the flanged sleeve is conically inclined so that the width of the sleeve portion decreases away from the flange portion, and the corresponding radially inwardly facing surface of the flange ring is conically inclined so that it matches the radially outwardly facing surface of the sleeve portion, whereby the flange ring is capable of holding the two parts of the flanged sleeve together during the preparation of the glued connection.

2. The flange connection according to claim 1, wherein the grooves and projections have an undulated shape in axial direction of the pipes.

3. The flange connection according to claim 1, wherein the cover ring is of a thermoplastic material corresponding to the inner layer, wherein the cover ring at least partially covers the end face of the flanged sleeve and wherein the cover ring is fixedly connected to the inner layer by means of a welded connection.

4. The flange connection according to claim 1, wherein the flanged sleeve is a standardized flange.

5. The flange connection according to claim 1, wherein the flanged sleeve and the flange ring are of glass fibers impregnated with synthetic resin.

* * * * *